United States Patent
Busbridge et al.

(10) Patent No.: US 10,846,616 B1
(45) Date of Patent: Nov. 24, 2020

(54) SYSTEM AND METHOD FOR ENHANCED CHARACTERIZATION OF STRUCTURED DATA FOR MACHINE LEARNING

(71) Applicant: Quintiles IMS Incorporated, Danbury, CT (US)

(72) Inventors: Daniel William Busbridge, London (GB); Gwyn Rhys Jones, Kent (GB); Peter Paul Riebel, Frankfurt am Main (DE)

(73) Assignee: IQVIA Inc., Parsippany, NJ (US)

( * ) Notice: Subject to any disclaimer, the term of this patent is extended or adjusted under 35 U.S.C. 154(b) by 840 days.

(21) Appl. No.: 15/581,655

(22) Filed: Apr. 28, 2017

(51) Int. Cl.
  *G06N 20/00* (2019.01)
  *G06F 16/2455* (2019.01)

(52) U.S. Cl.
  CPC ......... *G06N 20/00* (2019.01); *G06F 16/2455* (2019.01)

(58) Field of Classification Search
  CPC .............................. G06N 2/00; G06F 16/2455
  See application file for complete search history.

(56) References Cited

U.S. PATENT DOCUMENTS

| | | | | |
|---|---|---|---|---|
| 4,821,333 | A * | 4/1989 | Gillies | G06K 9/56 382/308 |
| 6,789,069 | B1 | 9/2004 | Barnhill et al. | |
| 6,898,585 | B2 * | 5/2005 | Benson | G05B 9/02 700/50 |
| 7,139,764 | B2 | 11/2006 | Lee | |
| 7,149,347 | B1 | 12/2006 | Wnek | |
| 8,266,148 | B2 | 9/2012 | Guha et al. | |
| 2003/0050902 | A1 * | 3/2003 | Buczak | G06N 3/126 706/13 |
| 2005/0071300 | A1 | 3/2005 | Bartlett et al. | |
| 2009/0135659 | A1 * | 5/2009 | Jones | G11C 16/14 365/185.29 |
| 2009/0154251 | A1 * | 6/2009 | Jones | G11C 16/3436 365/185.22 |
| 2010/0179930 | A1 | 7/2010 | Teller et al. | |
| 2010/0185722 | A1 * | 7/2010 | Jones | G06Q 30/0603 709/203 |
| 2014/0372346 | A1 | 12/2014 | Philipps et al. | |
| 2015/0294220 | A1 | 10/2015 | Oreif | |
| 2018/0060738 | A1 * | 3/2018 | Achin | G06Q 30/0201 |
| 2018/0129976 | A1 * | 5/2018 | Vigoda | G06N 7/005 |
| 2019/0155945 | A1 * | 5/2019 | Zhelezniak | G06F 16/338 |

* cited by examiner

*Primary Examiner* — Paulinho E Smith
(74) *Attorney, Agent, or Firm* — Fish & Richardson P.C.

(57) ABSTRACT

A computer-implemented method includes a computing system having a database that stores multiple datasets and that accesses the database to perform operations on a first dataset to produce multiple second datasets. The system determines a relationship between the first dataset and each second dataset of the multiple second datasets. The system also determines a relationship between respective groups of the first dataset and determines a relationship between respective groups of each second dataset. The system generates summary objects based, in part, on the determined relationships between respective groups of the first and second datasets. The system includes a machine learning system that uses the respective summary objects to analyze the performed operations that produced the multiple second datasets. Based on the analyzed performed operations, the machine learning system generates a data analysis model that indicates sequences of operations for achieving particular desired data analysis outcomes.

19 Claims, 5 Drawing Sheets

SYSTEM AND METHOD FOR ENHANCED CHARACTERIZATION OF STRUCTURED DATA FOR MACHINE LEARNING

BACKGROUND

This specification relates to characterization of structured data for machine learning systems.

Entities that manage large repositories of data may have a demand for low latency interactive computations. Interactive computations can correspond to users providing inputs to a computing system, such as making a selection, or executing a click function, and the system computing and providing an output desired by the user in a timeframe that is sufficient to the user. Business or medical professionals, such as executives, data analysts, or health scientists, may require interactive computing solutions that enable them to make informed decisions.

Artificial neural networks refer to a family of statistical models that can be used to approximate functions that depend on a large number of inputs. For instance, artificial neural networks can include sets of adaptive weights such as numerical parameters that are adjusted by a learning algorithm. A computing system may include a machine learning system that uses neural networks that form multiple layers and each layer can include multiple artificial neurons. The machine learning system can receive data from large datasets to perform computations that generate inferences about the received data.

SUMMARY

A computing system stores datasets and performs operations on the datasets to produce multiple structured datasets that each include respective groups of data elements. At least one module of the system receives the structured datasets and reduces the datasets to respective forms that capture differences between the respective groups of each structured dataset. Respective summary objects are generated for each structured dataset and each summary object describes differences between the respective groups of each structured dataset. The summary objects correspond to a particular form and each have a consistent data structure or shape relative to each other.

The summary objects are provided to a machine learning system that is configured to analyze the performed operations based on difference data indicated by the summary objects. Based on the analysis of the performed operations, the machine learning system determines inferences about the operations and methods that produce the respective groups of a structured dataset. The machine learning system can also determine how operations that produce the respective groups affect the overall content of a particular structured dataset. The machine learning system generates a data analysis model that is configured to indicate a total expected future reward for at least one performed operation.

One aspect of the subject matter described in this specification can be embodied in a computer-implemented method. The method includes accessing, by a computing system, a database that includes a first dataset having multiple data elements; performing, by the computing system, one or more operations on the first dataset to produce multiple second datasets, wherein each performed operation produces respective second datasets of the multiple second datasets; and analyzing, by the computing system, respective groups of the first dataset and respective groups of each second dataset of the multiple second datasets.

The method also includes, in response to analyzing, generating, by the computing system, one or more summary objects and a respective balance metric for each of the one or more summary objects, wherein each of the one or more summary objects characterizes the respective groups of the first dataset or characterizes the respective groups of each second dataset; providing, by the computing system and to an input layer of a machine learning system, each of the one or more summary objects and the respective balance metric for each of the one or more summary objects, wherein the machine learning system uses the one or more summary objects and the respective balance metric to analyze each of the one or more performed operations that produce the respective second datasets; and generating, by the machine learning system and based on evaluating each of the one or more performed operations, a data analysis model configured to indicate a particular expected outcome for at least one performed operation.

These and other implementations can each optionally include one or more of the following features. For example, in some implementations, the data analysis model is generated based on multiple machine learning inferences that are used to indicate a total expected future reward of the computing system performing the at least one performed operation. In some implementations, the method further includes: receiving, by the computing system, a user query that seeks a response which identifies a relationship between at least two data elements of the database; and in response to receiving the query, using the data analysis model to generate a response to the query, wherein the data analysis model accesses the database and generates the response to the query within a threshold response time.

In some implementations, the data analysis model is configured to: i) identify a particular sequence of performed operations that generates a particular expected outcome; and ii) use the particular sequence of performed operations to generate the response to the received query. In some implementations, analyzing the respective groups of the first dataset and the respective groups of each second dataset includes: performing, by a control module of the computing system, one or more difference calculations that determine differences between respective groups of the first dataset and that determine differences between respective groups of each second dataset; and generating, by the control module and in response to performing the one or more difference calculations, one or more change values, wherein: i) each change value of the one or more change values indicates the determined differences between the respective groups of the first dataset; or ii) each change value of the one or more change values indicates the determined differences between respective groups of each second dataset.

In some implementations, the control module includes a data module that is configured to: characterize the first dataset based on the determined differences between the respective groups of the first dataset; characterize each second dataset based on the determined differences between respective groups of each second dataset; and enable the control module to associate certain characterizations with certain performed operations that produce each second dataset.

In some implementations, generating the one or more summary objects comprises: receiving, by the control module and for analysis by the data module, at least one of the first dataset or each second dataset of the multiple second datasets; analyzing, by the data module and based on control signals received from the control module, column data of the first dataset and column data of each second dataset; and in response to analyzing, generating, by the control module, the one or more summary objects that each include a number of columns that matches a number of columns of the first dataset.

In some implementations, generating the one or more summary objects further includes: performing, by the data module, one or more column-wise operations that include: i) detecting that multiple data elements of a column each include a matching data value and determining a zero change value in response to detecting that multiple data elements of the column each include the matching data value; and ii) performing the one or more difference calculations to generate the one or more summary objects. In some implementations, the one or more summary objects each have a consistent data structure relative to each other, and each summary object of the one or more summary objects either: i) indicates the determined differences between respective groups of the first dataset; or ii) indicates the determined differences between respective groups of each second dataset of the multiple second datasets.

Another aspect of the subject matter described in this specification can be embodied in a computer-implemented method. The method includes, performing, by a computing system, one or more operations on a first dataset to produce multiple second datasets, wherein the first dataset is accessed from a database; generating, by the computing system, respective summary objects based on one of: i) a determined difference between the first dataset and each second dataset; ii) characterizations about respective groups of the first dataset; or iii) characterizations about respective groups of each second dataset; using, by a machine learning system, the respective summary objects to analyze the one or more performed operations that produce the multiple second datasets; and generating, by the machine learning system and based on evaluating each of the one or more performed operations, a data analysis model configured to indicate a particular expected outcome for at least one performed operation of the one or more performed operations.

These and other implementations can each optionally include one or more of the following features. For example, in some implementations, further comprising: receiving, by the computing system, a user query that seeks a response which identifies a relationship between at least two data elements of the database; and in response to receiving the query, using the data analysis model to generate a response to the query, wherein the data analysis model accesses the database and generates the response to the query within a threshold response time.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented to realize one or more of the following advantages. The described subject matter enables structured datasets to be submitted to a machine learning system that determines particular operational sequences and that generates data analysis models based on learned inferences. A computing system may use the data analysis model to execute certain operational sequences to determine accurate responses to system queries within a threshold response time that is less than conventional data analysis processes.

Systems and methods according to the described teachings enable use of deep-reinforcement learning to generate inferences about changes to structured datasets. Respective groupings within a dataset can be characterized to generate summary objects that each have a consistent/matching data structure. Use of the summary objects enables the machine learning system to execute deep-reinforcement learning such that inputs of a consistent shape are continuously received and analyzed to generate learned inferences.

Hence, the described computing system uses a machine learning system including predictive algorithms to analyze summary object data about performed operations. This analysis enables computations for a particular data analysis use case to be performed rapidly and efficiently. The machine learning system learns optimal, or more efficient, computational sequences for achieving a particular data analysis outcome. Use of these learned computational sequences may result in fewer instructions that are executed by processors of the computing system, thus translating to enhanced computational efficiency. Such enhanced efficiency may result in reduced processor utilization and memory access operations relative to data processing operations. Thus, system throughput may be increased thereby leading to more efficient processor and memory utilization.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

According to the disclosed technologies, a computing system is described that includes a database that stores multiple datasets and that accesses the database to perform operations on a first dataset to produce multiple second datasets. The system determines a relationship between the first dataset and each second dataset of the multiple second datasets. The system also determines a relationship between respective groups of the first dataset and determines a relationship between respective groups of each second dataset.

The system generates summary objects based, at least, on the determined relationships between the first dataset and each second dataset. The system includes a machine learning system that uses the respective summary objects to analyze the performed operations that produced the multiple second datasets. Based on the analyzed performed operations, the system uses the machine learning system to generate a data analysis model that indicates a total expected future reward for at least one performed operation.

Figure 1:
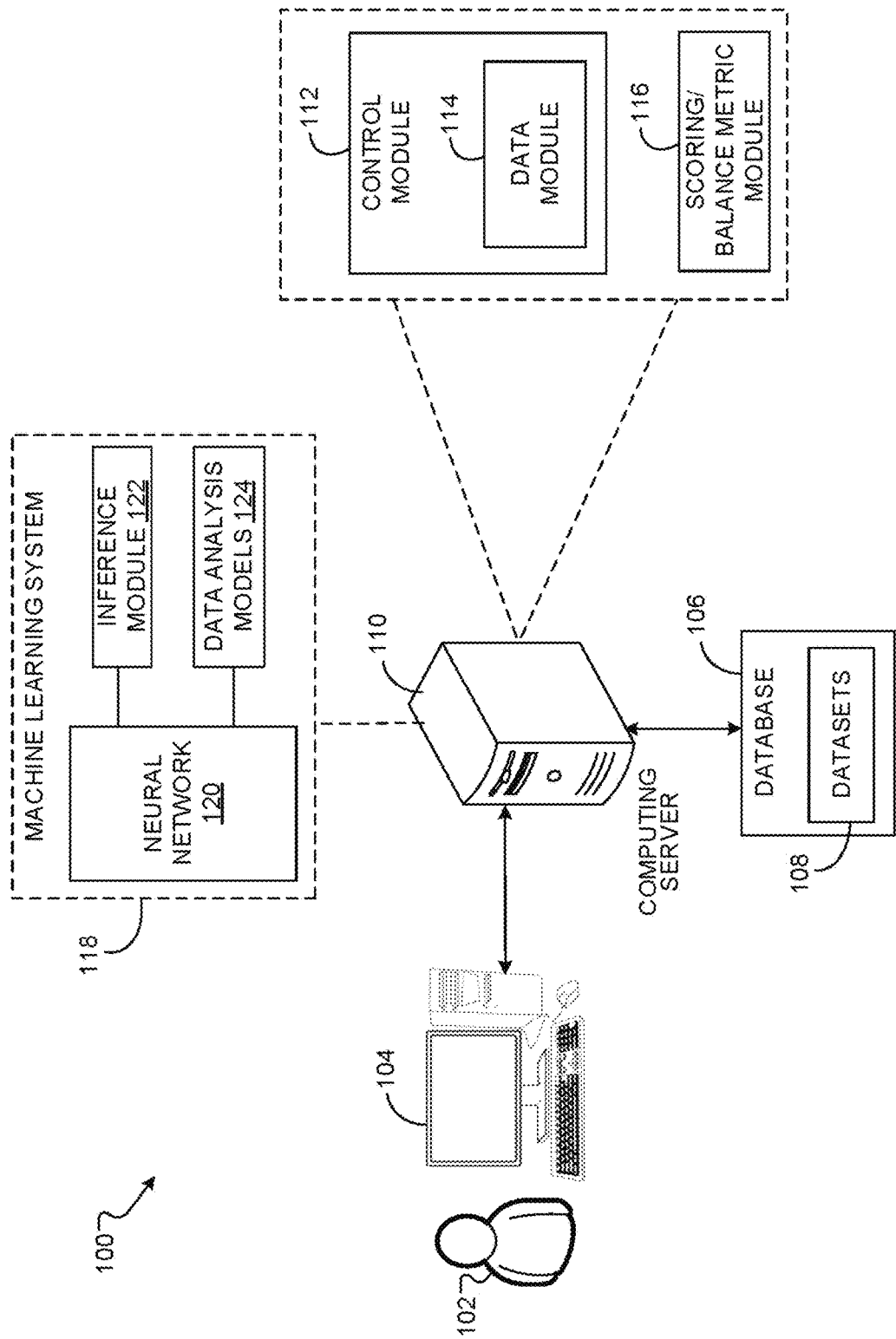
FIG. 1 shows a block diagram of an example computing system for restructuring datasets and for using machine learning processes on one or more restructured datasets.

FIG. 1 shows a block diagram of a computing system 100 for restructuring datasets and for using machine learning processes on one or more restructured datasets. System 100 can include multiple computers, computing servers, and other computing devices that each include processors and memory that stores compute logic or software instructions that are executable by the processors. In some implementations, multiple computers can form a cluster computing node, while multiple nodes can form node clusters. Cluster computing nodes and/or node clusters may be used to perform restructuring of datasets and machine learning processes described herein.

System 100 includes a user console 104, a database 106, and a computing server 110. Although depicted in FIG. 1 as a desktop computer, console 104 can be any known computer system, such as a desktop computer, a laptop computer, a tablet device, a mobile device, or any other related computing device that receives user input.

In general, console 104 is configured to receive user input from a human user 102 and system 100 can analyze or process the user input to cause server 110 to perform computational operations that are responsive to the user input. As discussed in more detail below, in some implementations, the user input may be a user command or query in which user 102 seeks a response from system 100. Console 104 may be one of multiple computing devices that are disposed within an example computer network and the network can generally include at least one database or storage device that stores database 106. As described in more detail below, database 106 can include one or more datasets 108.

Database 106 can be stored within an example data storage device such as a computing resource(s) configured to store large amounts of data (e.g., large datasets exceeding 5 terabytes (TB) or more). Example computing resources for data storage can include various electronic data storage devices that use electrical power to store and retrieve data. The data can be stored in either an analog format or a digital format and can be stored on a variety of media. Example data storage devices can include hard drives, server based storage devices, or cloud storage systems including multiple distinct devices.

Server 110 is configured to access database 106 to receive or obtain datasets 108 to perform one or more operations on the datasets (described below). As shown in FIG. 1, server 110 can include, or be configured to access, control module 112, scoring module 116, and database 106. Server 110 can be further configured to analyze the received query and to access database 106 to obtain at least one dataset 108 that can be used to compute a response to the query. Dataset 108 can include respective groups or portions of data elements that form respective individual datasets.

Server 110 can access database 106 to obtain multiple datasets 108 for performing computations that cause a first dataset 108 to be modified such that a second dataset 108 is formed. For example, a first dataset 108 can include a first group of data elements and a second group of data elements. An example operation can be performed, by server 110, on the first dataset 108 to modify or reduce the number of data elements in the first and second groups of first dataset 108. Hence, the performed operation produces a second dataset 108 having a first group of data elements and a second group of data elements that each include fewer data elements than the first and second groups of first dataset 108.

Control module 112 includes a data module 114 that can be configured to analyze one or more datasets 108 so as to characterize the datasets in view of operations that are performed on a first dataset to produce one or more second datasets. For example, data module 114 can analyze one or more data elements of a dataset and characterize the dataset into a standard form such as a summary object (described below).

As discussed briefly above, in some implementations, dataset 108 can include at least a first group of data elements and a second group of data elements. For at least these two groups, module 112 may be configured to characterize the first group of data elements and the second group of data elements to detect or determine a particular difference between the two groups. Module 112 can then generate a summary object having a standard form data structure and that includes parameters which are indicative of detected differences between the first and second groups of data elements.

Scoring module 116 includes computing logic for generating a score or balance metric that evaluates each operation that is performed by server 110 to produce each respective second dataset 108. For example, scoring module 116 can generate a score that indicates the extent to which a particular performed operation modifies a first dataset to produce a particular second dataset that can be used by system 100 to generate a desired or accurate response to user query received by console 104.

In some instances, a user query may seek to identify multiple matching data elements in a dataset 108 of database 106. Hence, in some examples, scoring module 116 may assign a relatively high score to a particular performed operation (compared to another performed operation) that produces a second dataset with multiple data elements that has, or includes, matching or overlapping data.

Server 110 can include, or be configured to access, a machine learning system 118. System 118 can include an example neural network 120, an inference module 122, and one or more data analysis models 124. In some implementations, computational operations performed by server 110 in response to user input at console 104 may include machine learning computations using neural network 120. In particular, system 118 may use machine learning logic including predictive algorithms to analyze summary object data about performed operations. This analysis enables future computations for a particular data analysis use case to be performed rapidly and efficiently by system 100.

For example, neural network 120 can include multiple neural network layers that are used to analyze and process summary object data. Inference module 122 can be configured to generate one or more inferences based on computational outputs determined by the neural network layers. The layer outputs can indicate learned observations derived from weightings of individual input neurons of neural network 120.

In some implementations, machine learning system 118 can be configured to continuously learn optimal, or more efficient, computational sequences that may be used by system 100 to obtain an accurate response to a certain user query. Further, these computational sequences may also be used by system 100 to compute/obtain an accurate response to certain user queries within a threshold time of receiving the query.

In general, system 100 is configured to obtain multiple candidate datasets for use in training a machine learning system to generate one or more trained data analysis models. The trained models can be used to efficiently analyze data elements of database 106 to determine accurate responses to received user queries within a threshold response time.

In some implementations, machine learning system 118 can be an example deep-reinforcement learning system and system 100 can be configured to use system 118 to generate accurate responses to complex data analysis queries or data matching queries (each described below) in a matter of hours or minutes. For example, system 100 can be configured to use deep-reinforcement learning to generate accurate responses to certain user queries in less than 5 minutes, less than 60 minutes, less than 5 hours, or less than 15 hours.

In comparison, without using system 100, computing accurate responses to similar queries can take a team of trained human data analysts or data analytics experts many weeks or months to complete. In contrast to the processes used by these data analyzers, the teachings of this specification describe a system 100 that provides the ability to generate accurate query responses or answers in hours or even minutes depending on the complexity of the query and the query parameters.

Computing server 110 and machine learning system 118 can each include processing units or devices that can include one or more processors (e.g., microprocessors or central processing units (CPUs)), graphics processing units (GPUs), application specific integrated circuits (ASICs), or a combination of different processors.

In alternative embodiments, server 110 and machine learning system 118, can each include other computing resources/devices (e.g., cloud-based servers) that provide additional processing options for performing one or more of the machine learning determinations and computations described in this specification. The processing units or devices can further include one or more memory units or memory banks. In some implementations, the processing units execute programmed instructions stored in memory to cause server 110 and machine learning system 118 to perform one or more functions described in this specification.

The memory units/banks can include one or more non-transitory machine-readable storage mediums. The non-transitory machine-readable storage medium can include solid-state memory, magnetic disk, and optical disk, a random access memory (RAM), a read-only memory (ROM), an erasable programmable read-only memory (e.g., EPROM, EEPROM, or Flash memory), or any other tangible medium capable of storing information.

Figure 2:
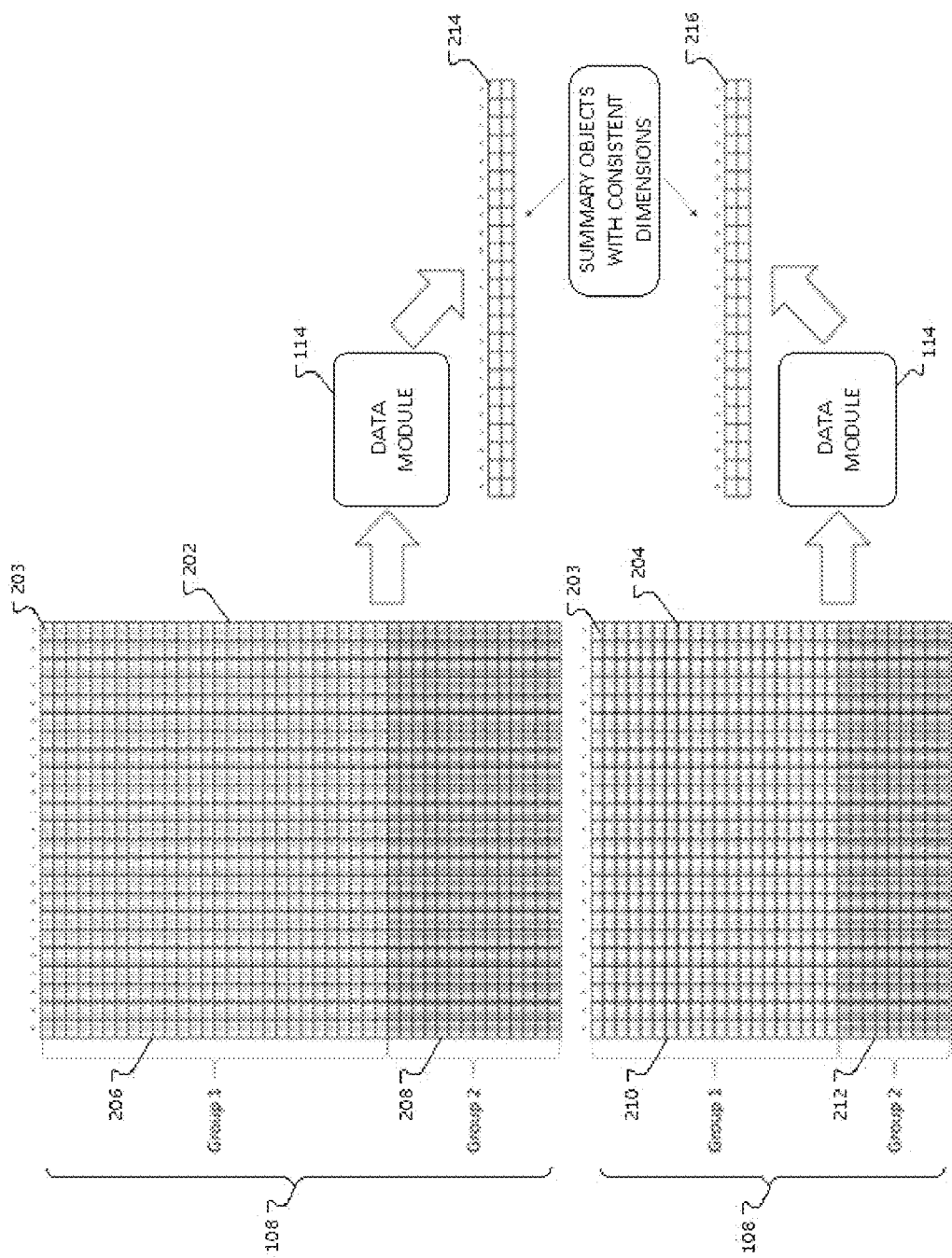
FIG. 2 shows a block diagram of example datasets and example restructured datasets.

FIG. 2 shows a block diagram of an example first dataset 202 and an example restructured dataset 204. First dataset 202 and restructured dataset 204 may each be associated with dataset 108 of database 106. As shown, each example dataset 202, 204 includes at least a first group of data elements 206, 210 ("group 1") and a second group of data elements 208, 212 ("group 2"). The listings or elements 203 of a dataset 202, or of a restructured dataset 204, can be in a row, column format, or can be formatted and stored as example relational databases, data frames, or other comparable data structures, such as pre-aggregated tables or cubes. In some implementations, data listings or groups of data elements 203 can be a table having sets of columns and rows.

In some implementations, datasets 108 includes multiple data elements received by system 100. Datasets 108 can include data related to a wide variety of subject matter or domains. The domains can correspond, for example, to disciplines, such as healthcare, finance, technology, engineering, information technology, health and nutrition, law, etc. For example, in the context of a healthcare discipline, datasets 108 can correspond to patient data records and the data elements can include data such as a patient's name, address, date of birth, drug prescriptions, or medical diagnosis.

In some implementations, datasets 202 and 204 each include at least two groups of data elements 203. For example, groups 1 206, 210 and groups 2 208, 212 in each dataset 202, 204 may represent characterizations or attributes about multiple patients or individuals that are associated with a particular medial study or clinical trial. In some instances, group 1 may be a group of patients that have been treated for illness A by taking pharmaceutical drug X. While in these same instances, group 2 may be a group of patients that also have illness A but that have not been treated for illness A by taking pharmaceutical drug X. Hence, for simplicity, group 1 may be treated patients and group 2 may be untreated patients.

In some implementations, database 106 can be configured to store datasets 108 in an example data format such that individual data elements (e.g., distinct row, column elements) can be quickly accessed and analyzed when system 100 executes computations for generating responses to received queries. In some implementations, database 106 includes multiple datasets 108. In some instances, at least two or more of the datasets 108 can be involved or used during a particular operation of system 100. In other instances, up to millions of datasets 108 can be involved in certain operations of system 100.

For example, database 106 can include a first dataset (e.g., dataset 202) and multiple second datasets (e.g., two or more datasets 204) and an example operation performed by system 100 can include comparing the first dataset to one of multiple second datasets (e.g., a candidate dataset) to determine a particular candidate second dataset that is most appropriate given a certain use case and given a certain user's needs.

In particular, a user may seek to determine how many untreated patients are similar to (or have attributes matching) treated patients within database 106 that are identified as having a particular illness for a given geographic region. Thus, the user seeks an accurate response to an example data matching query that indicates a particular matching outcome. The matching outcome involves system 100 accurately identifying the appropriate subset of untreated patients that have the particular illness and that match, or are similar to, treated patients within the predefined geographic region.

During an example operational sequence of system 100, computing server 110 can receive a split (e.g., group 1 210 and group 2 212), structured dataset 204 of any number of data elements (e.g., patient data). In some implementations, the dataset is split based on one or more operations that have been performed on dataset 202. In some instances, operations are performed on dataset 202 due to analysis steps performed in response to compute logic or programmed instructions executed by computing server 110.

For example, system 100 can perform one or more operations on first dataset 202 to produce multiple split, structured, second datasets 204 and each performed operation produces a respective second dataset 204 of the multiple structured second datasets. In some implementations, each performed operation may be one of multiple operations that are performed on first dataset 202 to determine a subset of data elements in first dataset 202 that have matching data attributes or values. For example, an operation can be performed on first dataset 202 (e.g., the original dataset) that results in the exclusion of some data elements from this original dataset, as well as possible changes to values of data elements, such as patient data, that are included in this original dataset.

System 100 analyzes, assesses, or evaluates the performed operations to determine if a performed operation achieved a desired effect or outcome. For example, system 100 can analyze a performed operation to determine whether the operation achieved a desired matching outcome, such as whether two patients having a particular illness were identified as being a part of the same clinical trial. Alternatively, system 100 can analyze a performed operation to determine whether the performed operation achieved a variety of other types of data related outcomes (e.g., whether the operation generated desired set of simulated data elements).

System 100 analyzes the performed operations by utilizing a neural network of a deep-reinforcement learning system, such as neural network 120 of machine learning system 118. In some implementations, analyzing or evaluating the performed operations includes system 100 using scoring module 116 to generate and assign a score or balance metric for the operations. For example, each performed operation may receive an example score (e.g., 0.9—good operation, 0.6—average operation, 0.3—poor operation) which indicates the extent to which the performed operation is an effective operation for achieving a particular data analysis outcome.

System 100 can determine if a performed operation achieved a desired effect or outcome by using server 110 to analyze, assess, or evaluate the respective groups (e.g., groups 206, 208) of dataset 202 and respective groups of each second dataset 204 (e.g., groups 210, 212). For example, analyzing the respective groups of first dataset 202 and the respective groups of each second dataset 204 can include control module 112 performing one or more difference calculations on the respective groups.

In particular, the difference calculations can be used to determine differences between respective groups 206, 208 of first dataset 202 and to determine differences between respective groups 210, 212 of each second dataset 204. Control module can be configured to generate one or more change values in response to performing the one or more difference calculations. In some implementations, each change value can indicate the determined differences between the respective groups of first dataset 202 or each change value can indicate the determined differences between respective groups of each second dataset 204.

As indicated briefly above, control module 112 includes data module 114 that can analyze datasets 202, 204 so as to characterize the datasets in view of operations that are performed on first dataset 202 to produce one or more second datasets 204. For example, control module 112 can be configured to use data module 114 to analyze one or more data elements of a dataset and characterize the dataset into a standard form such as a summary object.

In some implementations, data module 114 is configured to: i) characterize first dataset 202 based on the determined differences between respective groups 206, 208 of first dataset 202; and ii) characterize each second dataset 204 based on the determined differences between respective groups 210, 212 of each second dataset 204. In view of these determined differences, control module 112 can be further configured to associate or link certain characterizations with certain performed operations that produced each second dataset 204.

In response to analyzing the respective groups of datasets 202, 204 and linking characterizations to performed operations, server 110 can generate one or more summary objects. For example, modules 112 and 114 can analyze one or more data elements of a dataset and characterize the dataset into a standard form such as a summary object. Namely, control module 112 can use data module 114 to generate a first summary object 214 based on analysis of dataset 202 and can use data module 114 to generate a second summary object 216 based on analysis of dataset 204. Each of the one or more summary objects either characterizes the respective groups of first dataset 202 or characterizes the respective groups of each second dataset 204.

In some alternative implementations, rather than analyzing respective groups of a dataset to determine differences based on performed difference calculations, an example data analysis use case can be creation or generation of simulated data. For example, an operation can be performed on a first dataset 202 to generate one or more second datasets 204 that each include simulated patient data. In particular, given two years of patient data indicated by dataset 202, an example operation may be performed to generate datasets 204 that provide a simulated set of four years of patient data to form a composite dataset of six years of patient data.

In this implementation, data module 114 can be configured to assess performance of system 100 in generating the simulated datasets. For example, data module 114 can be configured to analyze dataset 204 to determine the integrity of the simulated data. In particular, the analysis can include comparing dataset 202 with dataset 204 to determine one or more indications regarding statistical distributions of the datasets. For example, column-wise operations used to compare datasets 202 and 204 can yield a mean parameter, a standard deviation parameter, and a range parameter for each column.

Control module 112 can then use data model 114 to generate at least one summary object that characterizes the simulated data so as to indicate the integrity of the simulated data relative to the actual patient data. For example, the generated summary object may include the mean parameter, the standard deviation parameter, and the range parameter for each column of dataset 204. In particular, the summary object can be analyzed, e.g., by a machine learning system, to determine whether the synthetic patients of dataset 204 are similar in their attributes to the real patients of dataset 202.

Regarding generating the summary objects, control module 112 can be configured to receive a single dataset 204 (or 202) and to execute compute logic to reduce the received dataset to a form that captures differences between at least two groups of a split structured dataset into a consistent form or summary object 216. For example, based on control signals received from control module 112, data module 114 can be configured to analyze column data of first dataset 202 and to analyze column data of each second dataset 204.

In response to analyzing the column data, control module 112 can generate summary objects 214, 216 that each include a number of columns that matches a number of columns of first dataset 202. In some implementations, summary objects 214, 216 each have a consistent data structure relative to each other, and each summary object either: i) indicates a determined difference between respective groups of first dataset 202; or ii) indicates a determined difference between respective groups of each second dataset 204.

Generating summary objects 214, 216 can include control module 112 providing control signals to data module 114 so as to call, or invoke, data module 114 to performing column-wise operations on at least one of datasets 202, 204. In some implementations, performing the column-wise operations includes one or more of: i) detecting that multiple data elements of a column each include a matching data value and determining a zero change value in response to detecting that multiple data elements of the column each include the matching data value; ii) performing one or more difference calculations between respective groups of a dataset so as to generate one or more summary objects; iii) using a division regularization to pre-empt divide-by-zero errors that may result from calculations performed by data module 114; or iv) data module 114 returning a single value per column per difference calculation.

In some implementations, control module 112 can be configured to receive multiple datasets 202, 204, rather than a single dataset 202 or dataset 204, and to reduce the multiple received datasets 202, 204 to respective distinct forms. These forms will also capture differences between respective groups of each split and structured dataset into a consistent form or summary object.

Hence, summary objects 214, 216 can be of a consistent form and have consistent dimensions irrespective of the number of data elements (e.g., individual patients) in datasets 202, 204. This consistent form object may then be submitted to a deep-reinforcement learning module or system, such as machine learning system 118. The deep-reinforcement learning system is configured to learn how methods for selecting how splits, groupings, or modifications of data elements of datasets 202, 204 affect the overall attributes of data elements in the datasets.

Figure 3:
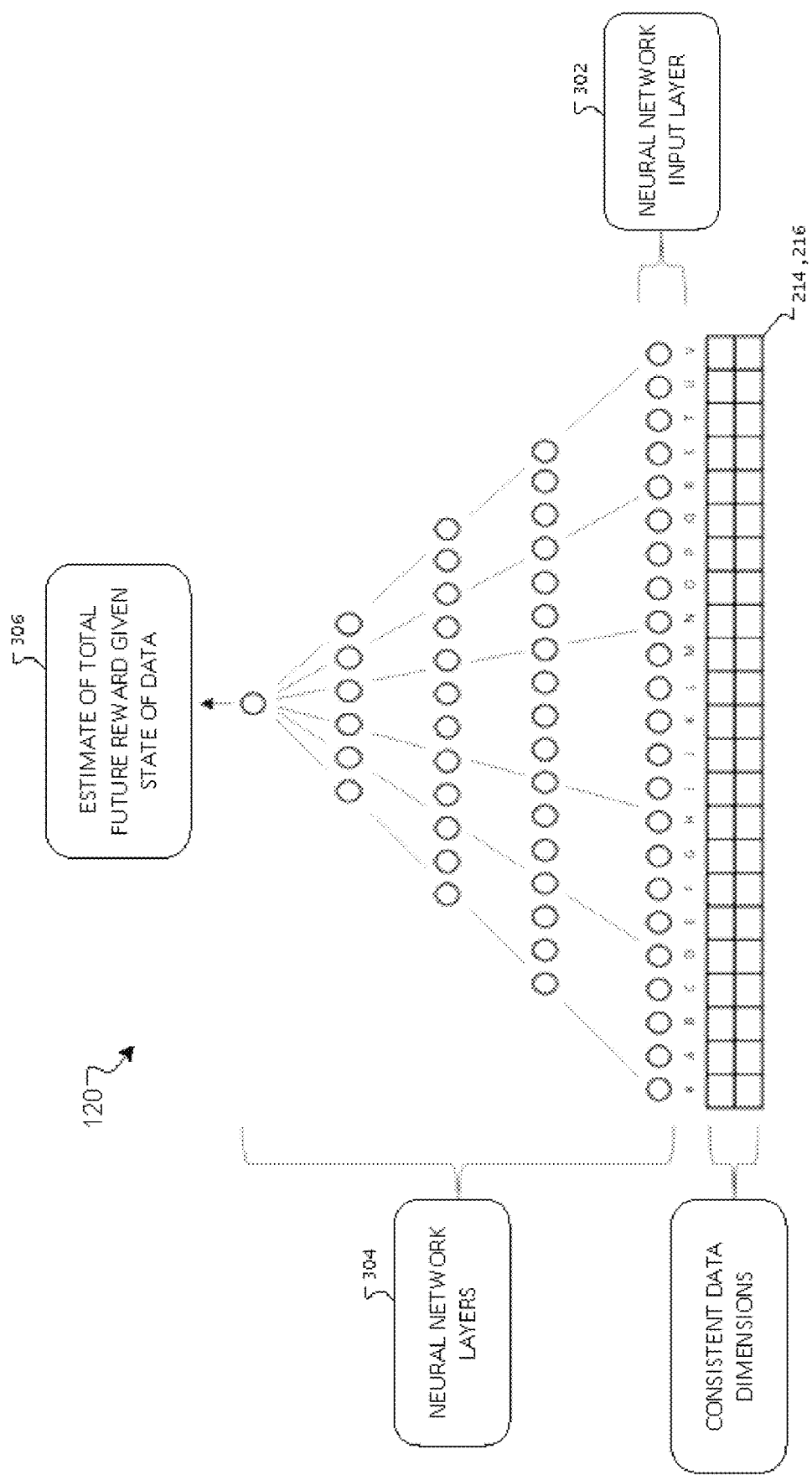
FIG. 3 shows an example multi-layer neural network of a machine learning system and that receives a summary object at an input layer of the neural network.

FIG. 3 shows an example multi-layer neural network 120 of a machine learning system and that receives one or more summary objects 214, 216 at an input layer 302 of neural network 120. As shown, neural network 120 includes input layer 302 and multiple other layers 304. In some implementations, layers 304 are hidden layers and layers 304 can include an example convolution layer or various other types of neural network layers.

Neural network 120 is configured to compare, with first dataset 202, each second dataset 204 that results from operations performed on dataset 202. Additionally, neural network 120 is also configured to compare each second dataset 204 with other second datasets 204 that result from other similar operations performed on first dataset 202. System 100 provides, and neural network 120 receives, data through input layer 302. In general, input layer 302 may be designed, by an example human developer, to have a certain input neuron configuration.

For example, neural network 120 can be designed such that input layer 302 has one neuron per input data point. Input layer 302 may also be designed such that an input neuron configuration is not adjustable after machine learning system 118 has commenced learning and inference operations. Thus, if second datasets 204 that result from operations on first dataset 202 are to analyzed, or compared, by neural network 120 with dataset 202, all datasets must result in data of a consistent shape or form.

In view of the need to have a data of a consistent shape or form, this specification provides a system and method for submitting structured datasets as observations to deep-reinforcement learning. For example, the described features of control module 112 and data module 114 can be utilized to generate summary objects that capture changes to data elements (e.g., changes to patient data) of datasets 204 as a representation that is suitable for use with neural network 120. Thus, use of the described summary objects 214, 216 enables a deep-reinforcement learning system to effectively learn one or more particular sequence of operations that can be utilized to change or modify dataset 202 to satisfy a particular data analysis use case or goal.

For example, system 100 can provide, to input layer 302 of neural network 120, each of the summary objects 214, 216 and the respective balance metrics for summary objects 214, 216. Machine learning system 118 can use summary objects 214, 216 and their respective balance metrics to evaluate and/or analyze each performed operation that produces the respective second datasets 204.

In particular, system 100 can cause machine learning system 118 to generate or compute steps that correspond to particular sequences of performed operations. These compute steps may be generated based on learned or observed inferences derived from neural network 120 executing one or more maximum likelihood algorithms on summary objects 214, 216.

One or more data analysis models 124 may be generated based on these learned or observed inferences. For example, system 100 can generate at least one data analysis model 124 based on evaluation of and/or analysis of each performed operation. The data analysis models can be generated based on multiple machine learning inferences that indicate a total expected future reward 306 of system 100 performing a certain performed operation on a particular dataset 202 or given a particular state of dataset 202.

System 100 can be configured to utilize reinforcement learning principles that correspond to reinforcement learning techniques used to training a particular person or species to perform a particular function. These reinforcement learning principals and techniques may have an association with behavioral reinforcement. Hence, functions of system 100, or learning processes of the system, may involve computer-based reward and computer-based penalty. For example, machine learning system 118 can be configured such that system 100 is rewarded for arriving at a certain desired data analysis outcome based on certain performed operations and penalized for arriving at a certain undesired data analysis outcome based on certain performed operations.

Thus, each time machine learning system 118 detects a particular performed operation that efficiently achieves a desired data analysis outcome, system 100 may be rewarded so as to reinforce execution of the particular performed operation. This reward earned by system 100 indicates that the particular performed operation is more apt to result in a certain desired data analysis outcome (e.g., a desired matching outcome).

In some implementations, system 100 uses machine learning system 118 to generate data analysis models 124 using machine learning logic executed by the system. Generated data analysis models 124 may be configured to indicate a particular expected outcome for a performed operation. In some instances, a data analysis model is configured to: i) identify a particular sequence of performed operations that generates a particular expected outcome; and ii) use the particular sequence of performed operations to generate the response to a received query.

In some implementations, an example computing system that includes data analysis model 124 can be configured to receive a query that seeks a response which identifies a relationship between at least two data elements of an example dataset, such as dataset 202. In response to receiving the query, the computing system can use data analysis model 124 to generate an accurate response to the query within a threshold response time.

In some implementations, models 124 are configured to continuously learn, infer, and/or encode compute steps or algorithms based on inference computations that are iteratively performed by neural network 120. The inference computations may be iteratively performed in response to new or reoccurring user queries received by model(s) 124 in which a user seeks an accurate response to a particular query.

As an indication of continuous learning, models 124 can be generated and configured such that accurate responses to reoccurring user queries are generated within threshold response times that are less than a first previous response time. For example, a first model 124 can be used to generate an accurate response to a first query within a first response time (e.g., one hour). While the same first model 124 can be later used to generate an accurate response to the same query, or a substantially similar query, within a second response time (e.g., 30 minutes) that is less than the first response time.

Figure 4:
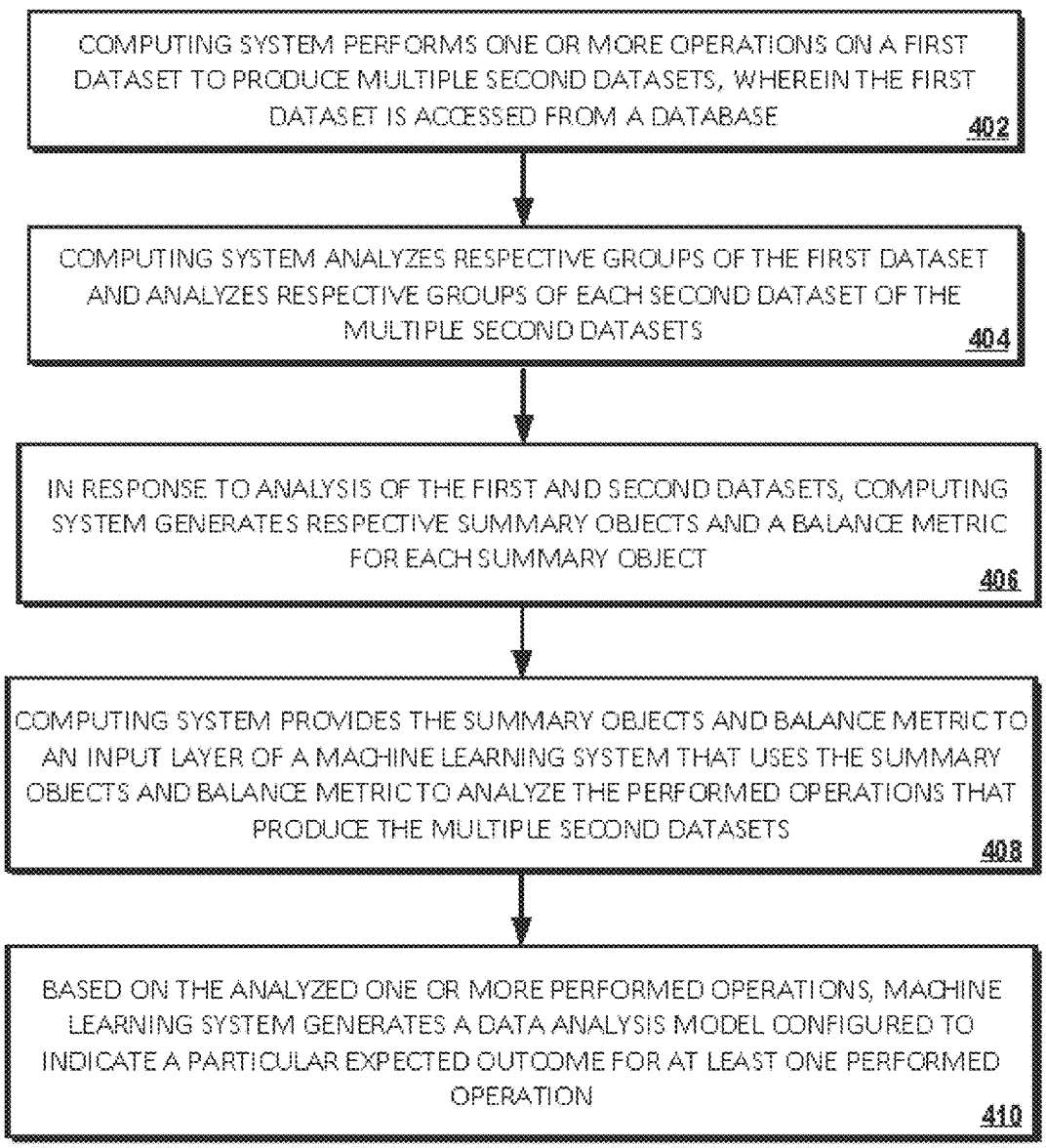
FIG. 4 shows a process flow diagram of an example iterative process for restructuring datasets and for using machine learning processes on one or more restructured datasets.

FIG. 4 shows a process flow diagram of an example process 400 for restructuring datasets and for using machine learning processes on one or more restructured datasets. Process 400 can be implemented using system 100 described above. Thus, descriptions of process 400 may reference one or more of the above-mentioned computing resources of system 100.

Process 400 includes system 100 accessing database 106 that includes a first dataset 202 associated with datasets 108 having multiple data elements 203. At block 402 of process 400, system 100 performs one or more operations on first dataset 202 to produce multiple second datasets 204 that may also be associated with datasets 108. In general, each performed operation produces respective second datasets 204 of the multiple second datasets. For example, each performed operation may be one of multiple operations that are performed on first dataset 202 to determine a subset of data elements in the first dataset that have all matching data attributes or values.

At block 404, system 100 analyzes respective groups of the first dataset and analyzes respective groups of each second dataset of the multiple second datasets. For example, system 100 can analyze group 1 206 and group 2 208 of first dataset 202 to determine differences between the respective groups 206 and 208 within each first dataset 202. Likewise, system 100 can analyze group 1 210 and group 2 212 of each second dataset 204 to determine differences between the respective groups 210 and 212 within each second dataset 204.

At block 406, in response to analyzing the respective groups 206, 208 of first dataset 202 and the respective groups 210, 212 of each second dataset 204, system 100 generates one or more summary objects and generates a respective balance metric for each of the one or more summary objects. Each of the one or more summary objects can either characterize the respective groups 206, 208 of first dataset 202 or characterize the respective groups 210, 212 of each second dataset 204.

At block 408, system 100 provides, to an input layer of machine learning system 118, each of the one or more summary objects and the respective balance metric for a particular summary object. Machine learning system 118 uses the summary objects and the respective balance metric for a particular summary object to evaluate and/or analyze each of the one or more performed operations that produced respective second datasets 204.

In some implementations, process steps associated with block 402 through block 408 may be performed iteratively such that, for each operation of the one or more operations, datasets are analyzed to generate summary objects and corresponding balance metrics which are then provided to an input layer of the machine learning system 118. For example, implementation of process 400 can include system 100 iteratively processing summary objects for successive distinct operations through layers of neural network 120. This iterative processing flow results in learned inferences that are continuously refined over time to determine optimal, or more efficient, computational sequences for achieving particular data analysis outcomes.

At block 410, system 100 generates at least one data analysis model 124 based on evaluation of and/or analysis of each of the one or more performed operations. In some implementations, system 100 uses machine learning system 118 to generate data analysis models 124 using machine learning logic executed by the system. The generated data analysis models can be configured to indicate a particular expected outcome for at least one performed operation of the one or more performed operations. Data analysis models 124 can be also configured to encode the determined optimal, or more efficient, computational sequences for achieving particular data analysis outcomes. Models 124 may also be configured to iteratively process operations performed on certain datasets such that encoded computing sequences are continuously refined over time based on future learned inferences.

Figure 5:
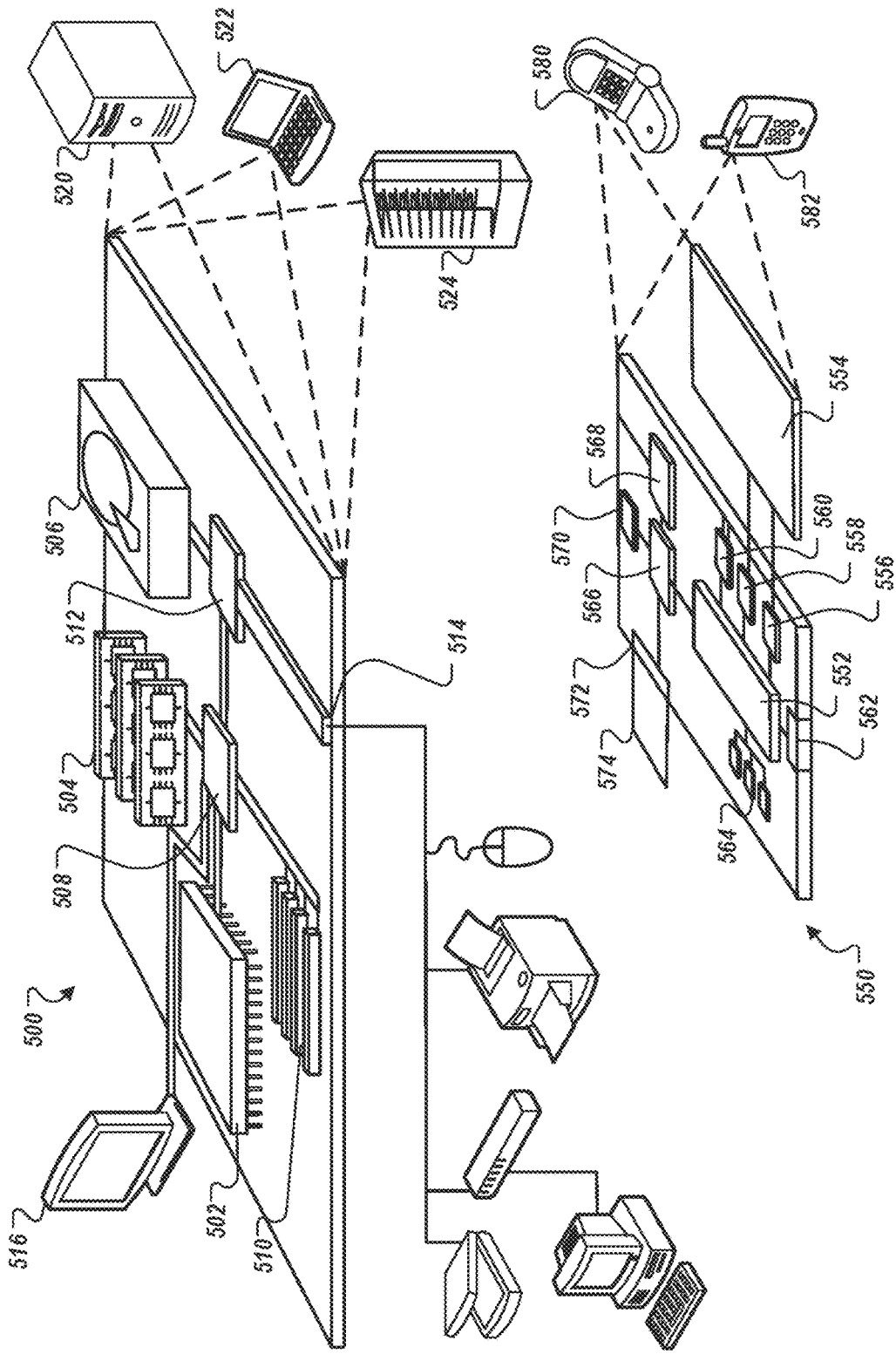
FIG. 5 shows a block diagram of a computing system that can be used in connection with computer-implemented methods described in this specification.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 606, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 600 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 758 and display interface 556 coupled to a display 554. The display 554 may be, for example, a TFT LCD display or an OLED display, or other appropriate display technology. The display interface 556 may include appropriate circuitry for driving the display 554 to present graphical and other information to a user.

The control interface 758 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550.

Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550. The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
   accessing, by a computing system, a database that includes a first dataset having multiple data elements;
   performing, by the computing system, one or more operations on the first dataset to produce multiple second datasets, wherein each performed operation produces respective second datasets of the multiple second datasets;
   analyzing, by the computing system, respective groups of the first dataset and respective groups of each second dataset of the multiple second datasets;

in response to analyzing, generating, by the computing system, one or more summary objects and a respective balance metric for each of the one or more summary objects, wherein each of the one or more summary objects characterizes the respective groups of the first dataset or characterizes the respective groups of each second dataset;

providing, by the computing system and to an input layer of a machine learning system, each of the one or more summary objects and the respective balance metric for each of the one or more summary objects, wherein the machine learning system uses the one or more summary objects and the respective balance metric to analyze each of the one or more performed operations that produce the respective second datasets; and generating, by the machine learning system and based on evaluating each of the one or more performed operations, a data analysis model configured to indicate a particular expected outcome for at least one performed operation.

2. The method of claim 1, wherein the data analysis model is generated based on multiple machine learning inferences that are used to indicate a total expected future reward of the computing system performing the at least one performed operation.

3. The method of claim 2, further comprising:
receiving, by the computing system, a user query that seeks a response which identifies a relationship between at least two data elements of the database; and
in response to receiving the query, using the data analysis model to generate a response to the query, wherein the data analysis model accesses the database and generates the response to the query within a threshold response time.

4. The method of claim 3, wherein the data analysis model is configured to:
i) identify a particular sequence of performed operations that generates a particular expected outcome; and
ii) use the particular sequence of performed operations to generate the response to the received query.

5. The method of claim 1, wherein analyzing the respective groups of the first dataset and the respective groups of each second dataset includes:
performing, by a control module of the computing system, one or more difference calculations that determine differences between respective groups of the first dataset and that determine differences between respective groups of each second dataset; and
generating, by the control module and in response to performing the one or more difference calculations, one or more change values, wherein:
i) each change value of the one or more change values indicates the determined differences between the respective groups of the first dataset; or
ii) each change value of the one or more change values indicates the determined differences between respective groups of each second dataset.

6. The method of claim 5, wherein the control module includes a data module that is configured to:
characterize the first dataset based on the determined differences between the respective groups of the first dataset;
characterize each second dataset based on the determined differences between the respective groups of each second dataset; and
enable the control module to associate certain characterizations with certain performed operations that produce each second dataset.

7. The method of claim 6, wherein generating the one or more summary objects comprises:
receiving, by the control module and for analysis by the data module, at least one of the first dataset or each second dataset of the multiple second datasets;
analyzing, by the data module and based on control signals received from the control module, column data of the first dataset and column data of each second dataset; and
in response to analyzing, generating, by the control module, the one or more summary objects that each include a number of columns that matches a number of columns of the first dataset.

8. The method of claim 7, wherein generating the one or more summary objects further comprises:
performing, by the data module, one or more column-wise operations that include:
i) detecting that multiple data elements of a column each include a matching data value and determining a zero change value in response to detecting that multiple data elements of the column each include the matching data value; and
ii) performing the one or more difference calculations to generate the one or more summary objects.

9. The method of claim 8, wherein the one or more summary objects each have a consistent data structure relative to each other, and each summary object of the one or more summary objects either:
i) indicates the determined differences between respective groups of the first dataset; or
ii) indicates the determined differences between respective groups of each second dataset of the multiple second datasets.

10. An electronic system, comprising:
one or more processing devices;
one or more machine-readable storage devices for storing instructions that are executable by the one or more processing devices to cause performance of operations that comprise:
accessing, by a computing system, a database that includes a first dataset having multiple data elements;
performing, by the computing system, one or more operations on the first dataset to produce multiple second datasets, wherein each performed operation produces respective second datasets of the multiple second datasets;
analyzing, by the computing system, respective groups of the first dataset and respective groups of each second dataset of the multiple second datasets;
in response to analyzing, generating, by the computing system, one or more summary objects and a respective balance metric for each of the one or more summary objects, wherein each of the one or more summary objects characterizes the respective groups of the first dataset or characterizes the respective groups of each second dataset;
providing, by the computing system and to an input layer of a machine learning system, each of the one or more summary objects and the respective balance metric for each of the one or more summary objects, wherein the machine learning system uses the one or more summary objects and the respective balance metric to analyze each of the one or more performed operations that produce the respective second datasets; and generating, by the machine learning system and based on evaluating each of the one or more performed operations, a data analysis model configured to indicate a particular expected outcome for at least one performed operation.

11. The electronic system of claim 10, wherein the data analysis model is generated based on multiple machine learning inferences that are used to indicate a total expected future reward of the computing system performing the at least one performed operation.

12. The electronic system of claim 11, further comprising:
receiving, by the computing system, a user query that seeks a response which identifies a relationship between at least two data elements of the database; and
in response to receiving the query, using the data analysis model to generate a response to the query, wherein the data analysis model accesses the database and generates the response to the query within a threshold response time.

13. The electronic system of claim 12, wherein the data analysis model is configured to:
i) identify a particular sequence of performed operations that generates a particular expected outcome; and
ii) use the particular sequence of performed operations to generate the response to the received query.

14. The electronic system of claim 10, wherein analyzing the respective groups of the first dataset and the respective groups of each second dataset includes:
performing, by a control module of the computing system, one or more difference calculations that determine differences between respective groups of the first dataset and that determine differences between respective groups of each second dataset; and
generating, by the control module and in response to performing the one or more difference calculations, one or more change values, wherein:
  i) each change value of the one or more change values indicates the determined differences between the respective groups of the first dataset; or
  ii) each change value of the one or more change values indicates the determined differences between respective groups of each second dataset.

15. The electronic system of claim 14, wherein the control module includes a data module that is configured to:
characterize the first dataset based on the determined differences between the respective groups of the first dataset;
characterize each second dataset based on the determined differences between respective groups of each second dataset; and
enable the control module to associate certain characterizations with certain performed operations that produce each second dataset.

16. The electronic system of claim 15, wherein generating the one or more summary objects comprises:
receiving, by the control module and for analysis by the data module, at least one of the first dataset or each second dataset of the multiple second datasets;
analyzing, by the data module and based on control signals received from the control module, column data of the first dataset and column data of each second dataset; and
in response to analyzing, generating, by the control module, the one or more summary objects that each include a number of columns that matches a number of columns of the first dataset.

17. The electronic system of claim 16, wherein generating the one or more summary objects further comprises:
performing, by the data module, one or more column-wise operations that include:
  i) detecting that multiple data elements of a column each include a matching data value and determining a zero change value in response to detecting that multiple data elements of the column each include the matching data value; and
  ii) performing the one or more difference calculations to generate the one or more summary objects.

18. The electronic system of claim 17, wherein the one or more summary objects each have a consistent data structure relative to each other, and each summary object of the one or more summary objects either:
  i) indicates the determined differences between respective groups of the first dataset; or
  ii) indicates the determined differences between respective groups of each second dataset of the multiple second datasets.

19. One or more non-transitory machine-readable storage devices storing instructions that are executable by one or more processing devices to cause performance of operations comprising:
accessing, by a computing system, a database that includes a first dataset having multiple data elements;
performing, by the computing system, one or more operations on the first dataset to produce multiple second datasets, wherein each performed operation produces respective second datasets of the multiple second datasets;
analyzing, by the computing system, respective groups of the first dataset and respective groups of each second dataset of the multiple second datasets;
in response to analyzing, generating, by the computing system, one or more summary objects and a respective balance metric for each of the one or more summary objects, wherein each of the one or more summary objects characterizes the respective groups of the first dataset or characterizes the respective groups of each second dataset;
providing, by the computing system and to an input layer of a machine learning system, each of the one or more summary objects and the respective balance metric for each of the one or more summary objects, wherein the machine learning system uses the one or more summary objects and the respective balance metric to analyze each of the one or more performed operations that produce the respective second datasets; and
generating, by the machine learning system and based on evaluating each of the one or more performed operations, a data analysis model configured to indicate a particular expected outcome for at least one performed operation.

* * * * *